(12) United States Patent
Miki et al.

(10) Patent No.: US 7,764,847 B2
(45) Date of Patent: Jul. 27, 2010

(54) IMAGE PROCESSING METHOD, IMAGE PROCESSING APPARATUS AND RECORDING MATERIAL

(75) Inventors: Takeo Miki, Machida (JP); Fumitoshi Morimoto, Shirakawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 993 days.

(21) Appl. No.: 11/516,497

(22) Filed: Sep. 7, 2006

(65) Prior Publication Data

US 2007/0052990 A1    Mar. 8, 2007

(30) Foreign Application Priority Data

Sep. 7, 2005    (JP)    ............................. 2005-259320

(51) Int. Cl.
    *G06K 9/32*    (2006.01)
(52) U.S. Cl. ...................................... 382/296; 382/115
(58) Field of Classification Search ................ 382/135, 382/137, 139, 140, 323, 296, 100, 128
    See application file for complete search history.

(56) References Cited

U.S. PATENT DOCUMENTS

| | | | | |
|---|---|---|---|---|
| 5,033,104 | A | * | 7/1991 | Amano ........................ 382/177 |
| 5,539,442 | A | * | 7/1996 | Hitoshi ........................ 347/183 |
| 6,901,862 | B2 | | 6/2005 | Yamaguchi et al. |
| 2005/0157149 | A1 | | 7/2005 | Yamaguchi et al. |

FOREIGN PATENT DOCUMENTS

| | | |
|---|---|---|
| EP | 1 385 121 A1 | 1/2004 |
| EP | 1 471 722 A2 | 10/2004 |
| EP | 1 494 168 A2 | 1/2005 |
| EP | 1 471 722 A3 | 7/2005 |
| JP | 6-59739 B2 | 8/1994 |
| JP | 09-011640 | 1/1997 |
| JP | 2001-071550 | 3/2001 |
| JP | 2002-166586 | 6/2002 |
| JP | 2004-328217 A | 11/2004 |
| KR | 0160625 | 5/1999 |

OTHER PUBLICATIONS

European Search Report dated Mar. 3, 2008 for Appln. No. 06018779.6-1228.
Korean Office Action dated May 15, 2008 for Appln. No. 10-2006-85401.

* cited by examiner

*Primary Examiner*—Matthew C Bella
*Assistant Examiner*—Dennis Rosario
(74) *Attorney, Agent, or Firm*—Pillsbury Winthrop Shaw Pittman, LLP (57) ABSTRACT

An image processing apparatus which forms an image on a recording medium by alternately driving a plurality of heaters linearly arranged in a main scanning direction alternately replaces even-numbered pixels and odd-numbered pixels of first image data in the main scanning direction by pixels of data which is not recorded for respective recording lines in a sub-scanning direction, rotates second image data different from the first image data by a preset angle and alternately converts pixels of the second image data into pixels of image data arranged in odd-numbered and even-numbered locations in the main scanning direction for respective lines in the sub-scanning direction, and superimposes the second image data processed on the first image data processed.

8 Claims, 7 Drawing Sheets

| 11 | 12 | 13 | 14 |
|----|----|----|----|
| 21 | 22 | 23 | 24 |
| 31 | 32 | 33 | 34 |
| 41 | 42 | 43 | 44 |

FIG. 7A

| 11' | 0 | 13' | 0 |
|-----|---|-----|---|
| 0 | 22' | 0 | 24' |
| 31' | 0 | 33' | 0 |
| 0 | 42' | 0 | 44' |

FIG. 7B

Row direction →

| | ls-4 | ls-3 | ls-2 | ls-1 | ls | ls+1 | ls+2 | ls+3 | ls+4 | (i columns) |
|---|------|------|------|------|----|------|------|------|------|-------------|
| 1 | 0 | 0 | 0 | 0 | 11 | 0 | 0 | 0 | 0 | |
| 2 | 0 | 0 | 0 | 31 | 22 | 13 | 0 | 0 | 0 | |
| 3 | 0 | 0 | 51 | 42 | 33 | 24 | 15 | 0 | 0 | |
| 4 | 0 | 71 | 62 | 53 | 44 | 35 | 26 | 17 | 0 | |

Column direction ↓
(j rows)

FIG. 8A

Scanning direction

| | 1 | 2 | 3 | 4 |
|---|---|---|---|---|
| 1 | 11 | 0 | 13 | 0 |
| 2 | 0 | 22 | 0 | 24 |
| 3 | 31 | 0 | 33 | 0 |
| 4 | 0 | 42 | 0 | 44 |

Sub-scanning direction

| 11 | 12 | 13 | 14 |
|----|----|----|----|
| 21 | 22 | 23 | 24 |
| 31 | 32 | 33 | 34 |
| 41 | 42 | 43 | 44 |

F I G. 11A

| 11' | 0   | 13' | 0   |
|-----|-----|-----|-----|
| 0   | 22' | 0   | 24' |
| 31' | 0   | 33' | 0   |
| 0   | 42' | 0   | 44' |

F I G. 11B

| 0 | 0   | 0   | 0   | 11' | 0   | 0   | 0   | 0 |
|---|-----|-----|-----|-----|-----|-----|-----|---|
| 0 | 0   | 0   | 31' | 22' | 13' | 0   | 0   | 0 |
| 0 | 0   | 51' | 42' | 33' | 24' | 15' | 0   | 0 |
| 0 | 71' | 62' | 53' | 44' | 35' | 26' | 17' | 0 |

F I G. 11C

| 0 | 0 | 0 | 0 | 11" | 0 | 0 | 0 | 0 |
|---|---|---|---|---|---|---|---|---|
| 0 | 0 | 0 | 31" | 22" | 13" | 0 | 0 | 0 |
| 0 | 0 | 51" | 42" | 33" | 24" | 15" | 0 | 0 |
| 0 | 71" | 62" | 53" | 44" | 35" | 26" | 17" | 0 |

FIG. 12A

| 11" | 0 | 13" | 0 |
|---|---|---|---|
| 0 | 22" | 0 | 24" |
| 31" | 0 | 33" | 0 |
| 0 | 42" | 0 | 44" |

FIG. 12B

IMAGE PROCESSING METHOD, IMAGE PROCESSING APPARATUS AND RECORDING MATERIAL

CROSS-REFERENCE TO RELATED APPLICATIONS

This application is based upon and claims the benefit of priority from prior Japanese Patent Application No. 2005-259320, filed Sep. 7, 2005, the entire contents of which are incorporated herein by reference.

BACKGROUND OF THE INVENTION

1. Field of the Invention

This invention relates to an image processing method and image processing apparatus which generate an image recorded on a recording medium in a thermal transfer recording system, for example, and a recording material on which an image generated by the above image processing method is recorded.

2. Description of the Related Art

Conventionally, for example, as a method for recording face images on recording media for individual authentication such as various licenses, credit cards and membership cards, a thermal transfer recording system is mainly used. In an image forming apparatus of the thermal transfer recording system, a plurality of heaters linearly arranged in the main scanning direction are driven to record an image on a recording medium. For example, in Jpn. Pat. Appln. KOKOKU Publication No. H6-59739, an image forming apparatus of the thermal transfer recording system which arranges dots used for image transfer in a so-called zigzag form and then records an image on a recording medium (which is referred to as an alternate drive system) is disclosed. In the alternate drive system, since dots used for image transfer can be easily controlled, a preferable image can be recorded on the recording medium. However, in the alternate drive system, since the dots used for image transfer are rearranged in a zigzag form and then an image is recorded, pixel information corresponding to dots which are not used for image transfer will be lost.

BRIEF SUMMARY OF THE INVENTION

An object of this invention is to provide an image processing method and image processing apparatus which can form images excellent in resistance to forgery and a recording material excellent in resistance to forgery.

According to a first aspect of this invention, there is provided an image processing method which is a method to generate an image formed on a recording medium by alternately driving a plurality of heaters linearly arranged in a main scanning direction and comprises replacing even-numbered pixels of first image data in the main scanning direction on alternate recording lines in a sub-scanning direction and odd-numbered pixels of the first image data in the main scanning direction on different alternate recording lines in the sub-scanning direction by pixels of data which is not recorded, rotating second image data which is different from the first image data by a preset angle, converting pixels of the second image data of respective recording lines into pixels of image data arranged in odd-numbered and even-numbered locations in the main scanning direction for respective alternate lines in the sub-scanning direction, and superimposing the second image data processed on the first image data processed.

According to a second aspect of this invention, there is provided an image processing apparatus which generates an image formed on a recording medium by alternately driving a plurality of heaters linearly arranged in a main scanning direction, comprising a first processing section which replaces even-numbered pixels and odd-numbered pixels of first image data in the main scanning direction by pixels of data which is not recorded alternately for respective lines in a sub-scanning direction, a second processing section which rotates second image data different from the first image data by a preset angle and converts pixels of the second image data into pixels of image data arranged in odd-numbered and even-numbered locations in the main scanning direction alternately for respective lines in the sub-scanning direction, and a third processing section which superimposes the second image data processed by the second processing section on the first image data processed by the first processing section.

According to a third aspect of this invention, there is provided a recording material on which an image including a first image subjected to a process for alternately replacing even-numbered pixels and odd-numbered pixels thereof in a main scanning direction by pixels of data which is not recorded for respective recording lines and a second image rotated by a preset angle, subjected to a process for alternately converting pixels thereof into odd-numbered and even-numbered pixels in the main scanning direction for respective lines in the sub-scanning direction and superimposed on the first image is recorded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will now be described an embodiment of this invention with reference to the accompanying drawings.

Figure 1:
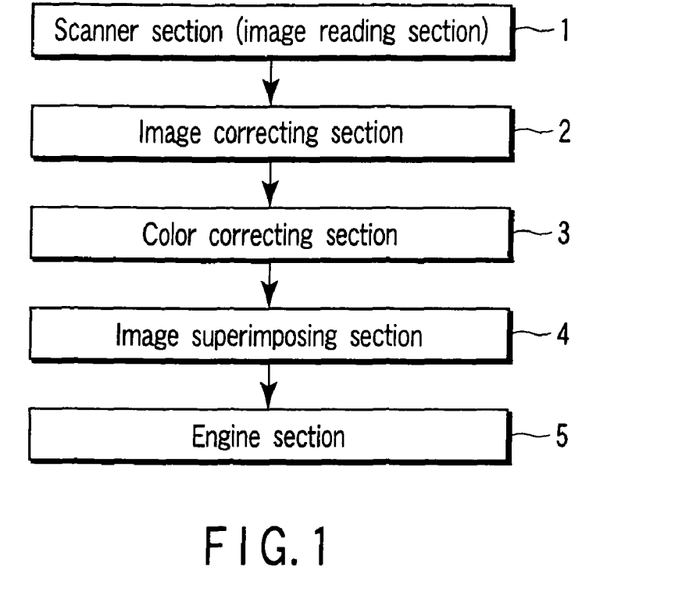
FIG. 1 is a block diagram schematically showing a configuration example of an image processing apparatus.

FIG. 1 schematically shows the configuration of an image processing apparatus to which an image processing method according to this invention is applied. The image processing apparatus includes a scanner section (image reading section) 1, input correcting section 2, color correcting section 3, image superimposing section 4 and engine section 5.

For example, the scanner section 1 reads an image as a color multi-gradation image. The color multi-gradation image contains image information divided into R (red), G (green) and B (blue) signals. Further, the scanner section 1 may read an image as a black-and-white multi-gradation image. The scanner section 1 supplies the read image signal to the input correcting section 2. It is supposed that the image read by the scanner section 1 corresponds to an original image of a first image on which a second image different from the first image is superimposed.

The input correcting section 2 subjects the image read by the scanner section 1 to a preset correcting process. For example, image signals divided into R (red), G (green) and B (blue) signals which configure a color multi-gradation image are input to the input correcting section 2 from the scanner section 1. In the input correcting section 2, the image signal input from the scanner section 1 is subjected to a gamma correction process, for example. The input correcting section 2 supplies the image signal subjected to the input correcting process to the color correcting section 3.

The color correcting section 3 subjects the image signal corrected by the input correcting section 2 to the color correcting process. For example, the color correcting section 3 corrects image signals obtained by dividing the image signal supplied from the input correcting section 2 into respective components of C (cyan), M (magenta), Y (yellow) or C, M, Y, K (black). The color correcting section 3 supplies the color-corrected image signals (image signals divided into C, M, Y or C, M, Y, K) to the image superimposing section 4.

The image superimposing section 4 performs a process of superimposing different image information on the image signals supplied from the color correcting section 3. For example, the image superimposing section 4 superimposes different image information on the image signals divided into C, M, Y or C, M, Y, K and supplied from the color correcting section 3. The different image information may be image information supplied from the exterior or previously stored in a memory (not shown). It is supposed that the image signal supplied from the color correcting section 3 corresponds to a first image and the different image information corresponds to a second image. The image superimposing section 4 supplies the image signal subjected to the superimposing process to the engine section 5. The process in the image superimposing section 4 will be described later in detail.

The engine section 5 records an image supplied from the image superimposing section 4 on a recording medium. The engine section 5 is an image forming device of a thermal transfer recording system. The engine section 5 includes a line-type thermal head having a plurality of heaters linearly arranged in a main scanning direction. The engine section 5 forms an image on a recording medium by use of the above line-type thermal head. For example, the engine section 5 is an image forming device of a melting-type thermal transfer recording system.

Next, the image forming system of the engine section 5 is explained.

As the thermal transfer recording system applied to the image processing process of the engine section 5, a sublimation-type thermal transfer recording system or melting-type thermal transfer recording system is provided.

In the sublimation-type thermal transfer recording system, pixels are transferred by use of a thermal head having heaters selectively heated based on image data with a thermal transfer ribbon and image recording medium stacked together. The thermal transfer ribbon used in the sublimation-type thermal transfer recording system is formed by coating dye with sublimation properties (or thermal transfer properties) on a film-like supporting body. Further, the image recording medium used in the sublimation-type thermal transfer recording system has a receptive layer which can receive sublimational dye.

In the sublimation-type thermal transfer recording system, a color image which is rich in gradation can be easily recorded. However, in the sublimation-type thermal transfer recording system, a material which can be dyed with a sublimational material is limited. Therefore, the sublimation-type thermal transfer recording system can be applied only to the image forming process for limited specified recording media. Further, generally, a sublimational material is low in the resistance to image degradation such as the light resistance and solvent resistance.

On the other hand, with the melting-type thermal transfer recording system, a melting-type thermal transfer ribbon is selectively heated by use of a thermal head having heaters selectively heated according to image data to transfer the pixels onto the image recording medium. The melting-type thermal transfer ribbon used in the melting-type thermal transfer recording system is obtained by coating a material formed by dispersing color pigment or dye into a binder such as resin or wax on a film-like supporting body.

In the melting-type thermal transfer recording system, inorganic or organic pigment which is generally said to have high light resistance can be applied as the color material.

Further, in the melting-type thermal transfer recording system, the solvent resistance can be enhanced by using adequate resin or wax used for the binder of the thermal transfer ribbon. Further, the melting-type thermal transfer recording system can be applied to image formation on a recording medium having adhesive property with respect to the binder of the thermal transfer ribbon. That is, the melting-type thermal transfer recording system can be applied to image formation on various types of recording media.

Further, in the melting-type thermal transfer recording system, a dot area gradation method in which an image is recorded with various gradations by changing the sizes of respective dots to be transferred is used. In the melting-type thermal transfer recording system, a method for recording an image by use of the so-called zigzag array of dots to be transferred (which is hereinafter referred to as an alternate drive system) in order to precisely control the sizes of the dots to be transferred is proposed. In the alternate drive system, thermal interference between adjacent heaters is reduced and the dot size can be controlled without being influenced by the adjacent pixels.

Next, an image forming process by the alternate drive system is explained in detail.

It is supposed that an image is formed on the recording medium by the alternate drive system in the engine section 5. In this case, it is assumed that the alternate drive system is a system in which odd-numbered transfer dots (pixels) and even-numbered transfer dots (pixels) in the main scanning direction are alternately transferred for respective lines in the sub-scanning direction. For example, a system which alternately drives the heaters of the thermal head for respective dots, or more specifically, a system which drives an image having pixels arranged in a zigzag form is referred to as the alternate drive system. In this example, it is supposed that the main scanning direction is a direction in which the heaters of the thermal head are arranged and the sub-scanning direction is a direction perpendicular to the main scanning direction.

Figure 2:
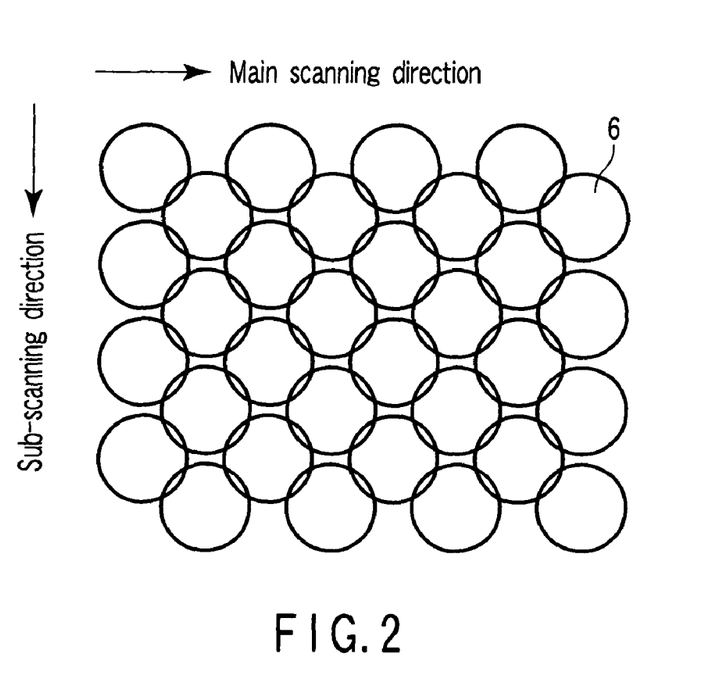
FIG. 2 is a schematic diagram showing an arrangement example of dots when heaters of a thermal head are alternately driven.

In the alternate drive system, the odd-numbered heaters in the main scanning direction in the odd-numbered lines in the sub-scanning direction and the even-numbered heaters in the main scanning direction in the even-numbered lines in the sub-scanning direction are alternately driven. In the above alternate drive system, an image having dots 6 arranged in a zigzag form is formed as shown in FIG. 2.

Figure 3A:
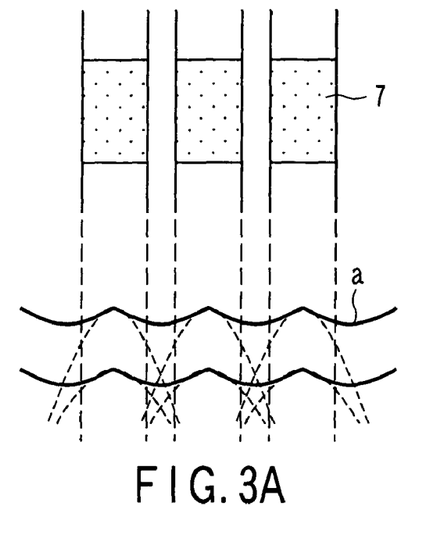
FIG. 3A is a schematic diagram showing the heaters of the thermal head and the temperature distribution in an ink layer of a thermal transfer ink ribbon when the whole heaters are driven.
Figure 3B:
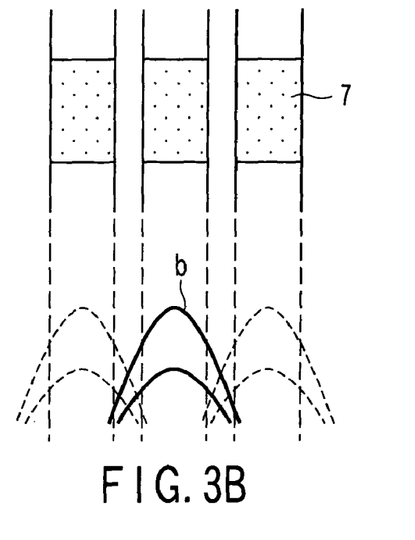
FIG. 3B is a schematic diagram showing the heaters of the thermal head and the temperature distribution in an ink layer of a thermal transfer ink ribbon when the heaters are alternately driven.

FIGS. 3A and 3B show the heaters of the thermal head and the temperature distribution in an ink layer of a thermal transfer ink ribbon. A reference symbol 7 in FIGS. 3A and 3B indicates the heater of the thermal head. When all of the heaters 7 are driven to record whole dots instead of the alternate drive operation, the distance between the adjacent heaters 7 is short as shown in FIG. 3A. Therefore, the thermal interference between the adjacent heaters occurs and the temperature distribution becomes flat (as indicated by a solid line "a" in FIG. 3A). This indicates that a state in which no temperature contrast occurs between the adjacent heaters 7 is set up. Thus, when all of the heaters 7 are driven to record all of the dots, precise dot size modulation cannot be performed and it becomes difficult to perform a multi-gradational recording operation.

On the other hand, in the case of the alternate drive system in which the adjacent heaters 7 in each recording line are not driven, as shown in FIG. 3B, the distance between the heaters 7 which are driven is large (more specifically, the distance is equal to twice the pitch of the heaters 7). Therefore, in the thermal head, heat escapes into the heaters 7 which are not driven. As a result, almost no thermal interference occurs between the heaters which are driven and the temperature distribution becomes abrupt (as indicated by a solid line "b" in FIG. 3B). That is, in the case of the alternate drive system, certain temperature contrast can be attained between the adjacent heaters 7. Therefore, in the alternate drive system, dots to be transferred can be formed without fail, the size of each dot can be certainly modulated without being influenced by the adjacent dots, and it becomes possible to perform a multi-gradational operation by using area gradation.

Next, a process for an image recorded on the recording medium in the engine section 5 of the alternate drive system is explained.

Figure 4:
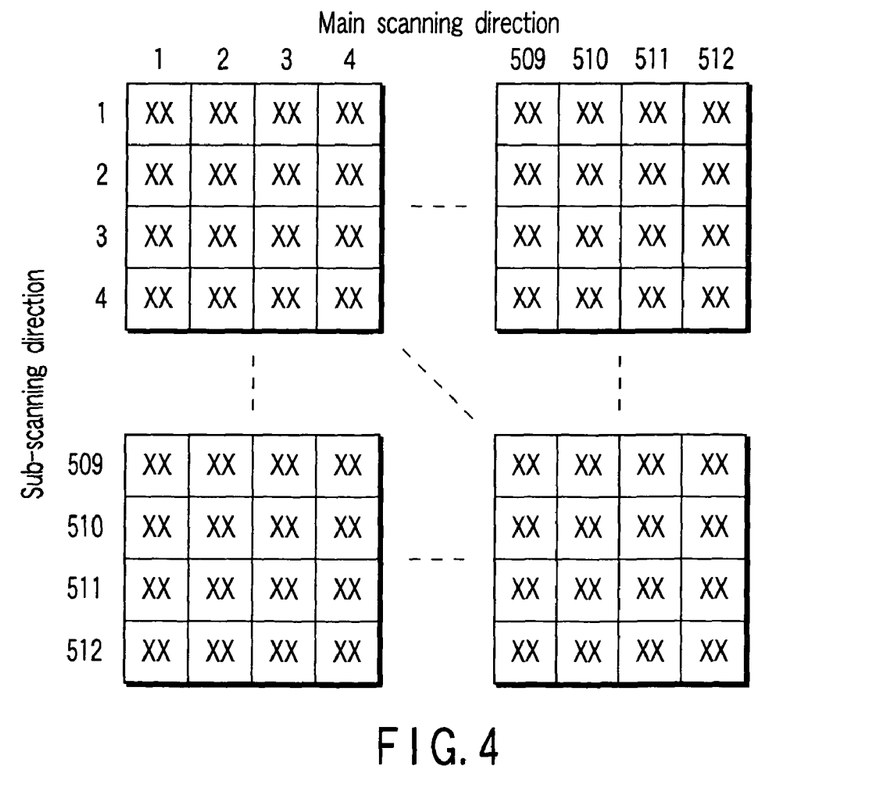
FIG. 4 is a schematic diagram showing an array example of pixels of image data.

FIG. 4 shows the array of pixels of image data read by the scanner section 1, for example. In FIG. 4, the line numbers of the pixels in the main scanning direction and sub-scanning direction are indicated by numerical values. The operation of recording pixels of one line in the sub-scanning direction (for example, in FIG. 4, first to 512-th pixels in the main scanning direction of the first line in the sub-scanning direction) is performed by transferring data of one line to the drive circuit of the thermal head (not shown), developing the data into data used for driving the thermal head and then driving the thermal head.

Figure 5:
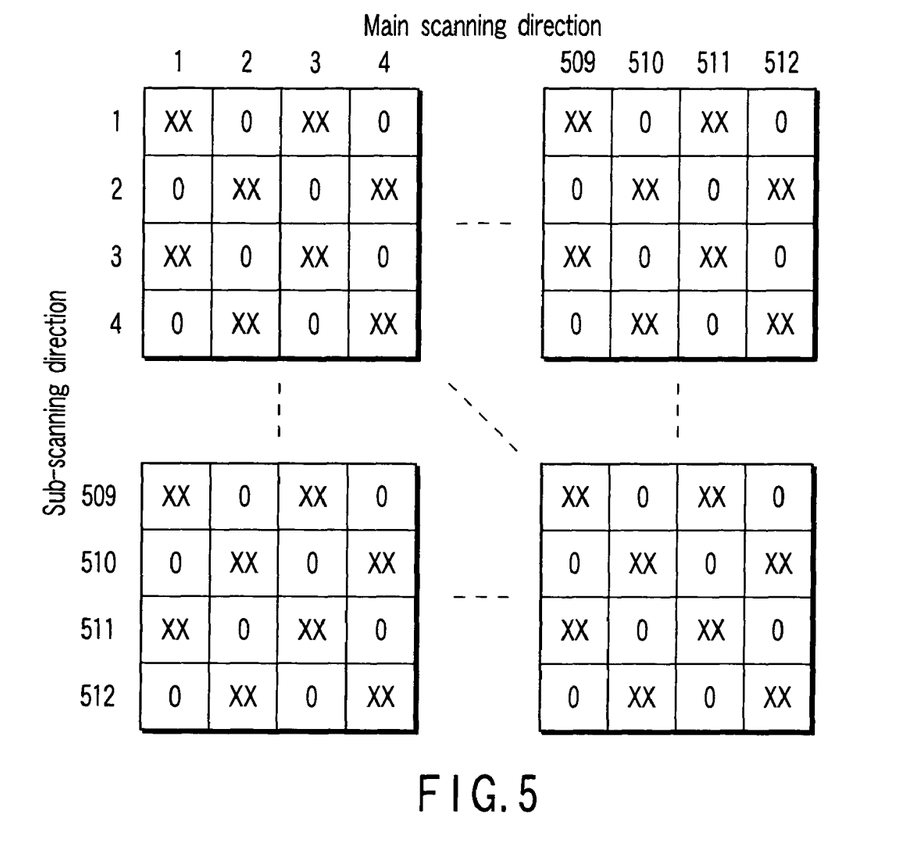
FIG. 5 is a schematic diagram showing an array example of pixels of image data which are converted into a zigzag array form.

In the alternate drive system of the heaters of the thermal head (an image forming apparatus of the alternate drive system), the odd-numbered heaters in the odd-numbered lines in the sub-scanning direction and the even-numbered heaters in the even-numbered lines in the sub-scanning direction are alternately driven for respective recording lines. Therefore, in image data recorded by use of the image forming apparatus of the alternate drive system, as shown in FIG. 5, it is required that data items (in this example, "0" data items) which are not recorded (corresponding heaters are not driven) be arranged in a zigzag form and pixel data items which are recorded according to the image data be arranged in portions corresponding to data items other than the data items "0".

In this case, a pixel adjacent in the main scanning direction to each of pixels of image data recorded by use of the image forming apparatus of the alternate drive system must have "0" data. This indicates that information of pixels in portions of data "0" will be lost if the pixels are arranged in the zigzag form after a different image is superimposed on an original image obtained before the pixels are arranged in the zigzag form and thus part of information of the superimposed image (embedded image) will be lost.

That is, in the alternate drive system, since dots are rearranged in a zigzag form to form an image, pixel information of a portion on which a dot is not transferred is lost. In a multi-gradation image such as a face image, information as the face image is not lost even if pixel information in the zigzag form is lost. However, in the case of a binary image such as a character or geometrical pattern, since pixel information of a portion on which dots are not transferred is lost if dots are transferred in a zigzag form, the function as the character or geometrical pattern cannot be attained in some cases.

Further, an image obtained by superimposing the character or geometrical pattern on a multi-gradation image such as a face image is difficult to be forged or falsified and becomes excellent in the resistance to forgery. Further, a printed material on which the above image is recorded is difficult to. be forged or falsified and is excellent in the resistance to forgery. However, if pixel information of a binary image of the character or geometrical pattern is lost in the alternate drive system, the character or geometrical pattern superimposed on the multi-gradation image does not function.

Next, first and second image processing methods used as the image processing method applied to the image superimposing section 4 are explained in detail.

In the following explanation, it is supposed that a multi-gradation image as a first image is mainly a monochrome image. The process explained below can also be applied when the first image is a color image.

First, the first image processing method is explained in detail.

Figure 6:
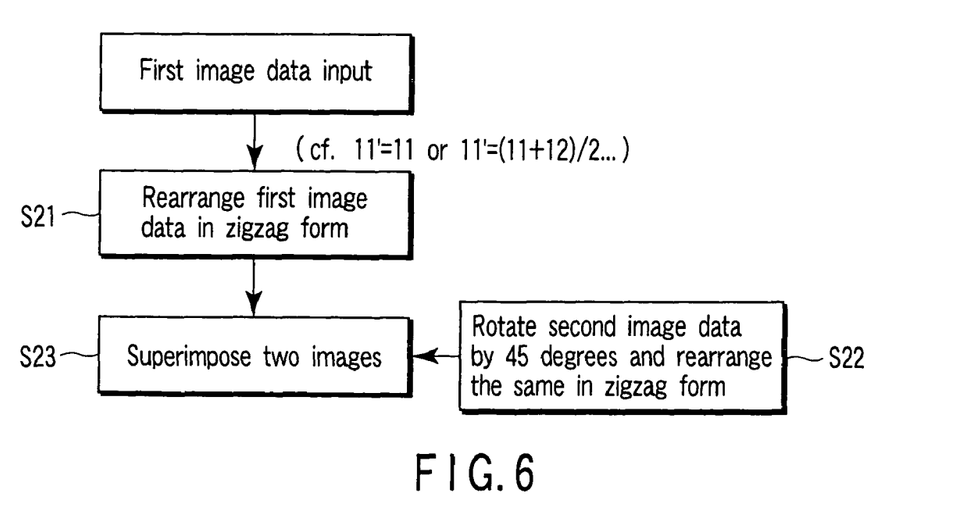
FIG. 6 is a flowchart for schematically illustrating the flow of a first image processing method.

FIG. 6 is a flowchart for schematically illustrating the flow of the image processing method according to the first image processing method.

Figure 7A:
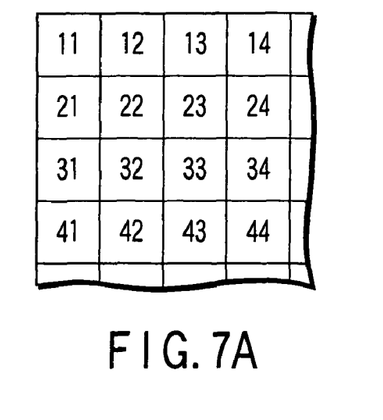
FIG. 7A is a diagram for illustrating the array of pixels of first image data to which a process (first process) by the first image processing method is applied.

First, the scanner section 1 acquires original image data of single color in which each image is divided into Y, M, C or Y, M, C, K. In the input correcting section 2 and color correcting section 3, the original image data divided into Y, M, C or Y, M, C, K and acquired by the scanner section 1 is subjected to a preset image process. Image data processed by the input correcting section 2 and color correcting section 3 is supplied to the image superimposing section 4 as first image data (embedding-use image). FIG. 7A is a diagram showing the array of pixels of the first image data supplied to the image superimposing section 4. The first image data is a multi-gradation image, for example.

First, the image superimposing section 4 performs a process for rearranging the pixels of the first image data processed by the input correcting section 2 and color correcting section 3 into the zigzag array form (step S21). The process of step S21 is to convert the array of pixels of the first image data input to the image superimposing section 4 into the pixel array corresponding to dots to be actually transferred by the engine section 5 of the alternate drive system.

Figure 7B:
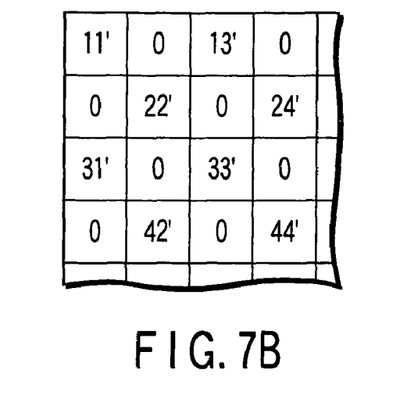
FIG. 7B is a diagram for illustrating the array of pixels of first image data obtained by subjecting the first image data of FIG. 7A to the first process.

FIG. 7B is a diagram showing the array of pixels of the first image data obtained by subjecting the first image data of FIG. 7A to the process of step S21, for example. As shown in FIG. 7B, in the rearranging process of step S21 for the first image data, each pixel on the odd-numbered row in the sub-scanning direction and on the even-numbered column in the main scanning direction (or each pixel on the even-numbered row in the sub-scanning direction and on the odd-numbered column in the main scanning direction) in data of the first image before processing (an image before the pixels are arranged in a zigzag form) is converted into a value of a pixel actually transferred by the engine section 5 of the alternate drive system. Each pixel other than the above pixel is converted into a value of a pixel which is not transferred by the engine section 5 of the alternate drive system. Further, a value of each pixel transferred can be converted into an average value of data values of adjacent pixels in the main scanning direction which contain the corresponding pixel in the image before the process. Alternatively, the value of the pixel in the image before the process can be kept unchanged. By the above process, the first image data shown in FIG. 7A is converted into image data in which to-be-transferred pixels shown in FIG. 7B are arranged in a zig-zag form.

The image superimposing section 4 performs a process for second image data (embedded image) superimposed on the first image data (step S22). The second image data may be previously set or formed of character information or the like. For example, the second image data may be input to the image superimposing section 4 from the exterior. The second image data is a binary image, for example.

In the process of step S22, the image superimposing section 4 performs a process of rotating the second image data by 45 degrees and converting pixels of the second image data into pixels of image data which are alternately arranged in odd-numbered and even-numbered locations in the main scanning direction for respective lines in the sub-scanning direction so as to prevent the pixels in the second image data from being lost.

Figure 8A:
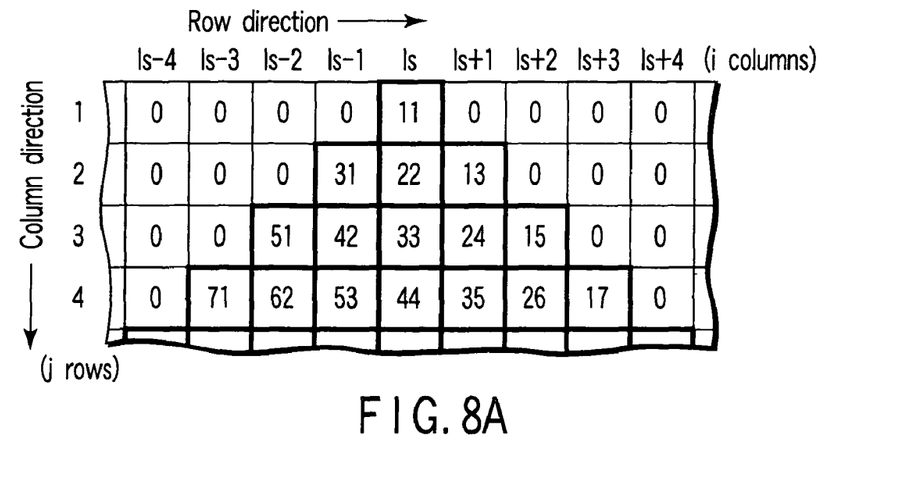
FIG. 8A is a diagram for illustrating the array of pixels of first image data to which a process (second process) by the first image processing method is applied.
Figure 8B:
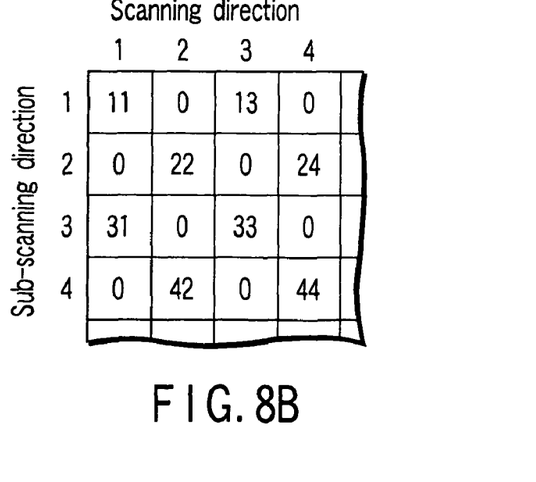
FIG. 8B is a diagram for illustrating the array of pixels of second image data obtained by subjecting the second image data of FIG. 8A to the second process.

For example, FIG. 8A is a diagram showing an example of the second image data and FIG. 8B is a diagram showing an example of second image data obtained after the second image data of FIG. 8A is subjected to the process of step S22. That is, as the processing result of step S22, the array of pixels of the second image data shown in FIG. 8A is converted into the zigzag array of pixels as shown in FIG. 8B. The pixels arranged in the zigzag form as shown in FIG. 8B correspond to dots to be actually transferred by the engine section 5 of the alternate drive system. Therefore, in the process of the step S22, the array of pixels of the second image data is converted into the array of pixels to be actually transferred by the engine section 5 of the alternate drive system without losing the pixels. The process of step S22 is explained in detail later.

The process of step S22 can be performed as a process different from the process of step S21 for the first image data. For example, the image superimposing section 4 may perform the process of step S22 for the second image data and the process of step S21 for the first image data in parallel or sequentially perform the processes. Further, when the second image data is preset image data, the image superimposing section 4 may previously perform the process of step S22 and hold second image data which has been processed into a memory or the like as the processing result.

When the process of step S21 for the first image data and the process of step S22 for the second image data are completed, the image superimposing section 4 performs a process of superimposing the second image (embedded image) processed in step S22 on the first image (embedding-use image) processed in step S21 (step S23). In the process of step S21 for the first image data, first image data input to the image superimposing section 4 is converted into first image data of the pixel array in a zigzag form so that pixels corresponding to dots transferred by the engine section 5 of the alternate drive system will become effective. Further, for example, as shown in FIG. 8B, in the process of step S22 for the second image data, the pixels of the second image data are converted into pixels of second image data of the pixel array in a zigzag form which is the same as the arrangement of the pixels of the first image data so that they will become pixels corresponding to dots to be transferred by the engine section 5 of the alternate drive system without losing the pixels.

Therefore, in the image superimposing section 4, a superimposed image with the pixels of the zigzag array in which the pixels corresponding to dots to be transferred by the engine section 5 of the alternate drive system will become effective can be acquired by superimposing the first image data processed in step S21 on the second image data processed in step S22. The image (superimposed image) having the second image data superimposed on the first image data by the process of step S23 is supplied from the image superimposing section 4 to the engine section 5. Thus, in the engine section 5, an image obtained by superimposing the second image data on the first image is recorded on a recording medium without losing the pixels in the second image data by use of the superimposed image obtained by the above process.

Next, in the first image processing method, the process (the process of step S22) for the second image data which is superimposed on the first image data is explained in detail.

In this case, the process (the process of step S22) for the second image is explained as the second image processing method with reference to FIGS. 8A and 8B. Further, it is supposed that second image data shown in FIG. 8A is configured by pixels of j rows×i columns. Pixels in areas surrounded by thick-line frames in FIG. 8A among the pixels which configure the second image data shown in FIG. 8A are used as pixels configuring effective pixels superimposed on the first image data.

In the process of step S22, the pixels are rotated by 45 degrees in the counterclockwise direction with the pixel in a reference position (for example, the center of the image) set as an axis and the second image data is converted so that the pixels thereof will be alternately arranged in the main scanning direction. As a result, the second image data shown in FIG. 8A is converted into image data in which pixels thereof are rearranged in a zigzag form as shown in FIG. 8B.

In the first image processing method explained here, the rotation angle of the second image is set to 45 degrees in the counterclockwise direction. However, the rotation angle is not limited to 45 degrees and, for example, it may be set to 135 degrees, 225 degrees or 315 degrees.

For example, in the second image shown in FIG. 8A, a pixel "11" is a pixel which lies in a reference position in the row direction and is set on the first row in the column direction. In this case, it is assumed that the column containing the pixel "11" is referred to as a column (is-th column) of the reference position. As shown in FIG. 8B, the pixel "11" is moved to a position of the first column in the main scanning direction and the first row in the sub-scanning direction by the process of step S22.

In the second image shown in FIG. 8A, a pixel "22" is a pixel which lies in a position of the column of the reference position in the row direction and the second row in the column direction. As shown in FIG. 8B, the pixel "22" is moved to a position of the second column in the main scanning direction and the second row in the sub-scanning direction by the process of step S22.

In the second image shown in FIG. 8A, a pixel "33" is a pixel which lies in a position of the column of the reference position in the row direction and the third row in the column direction. As shown in FIG. 8B, the pixel "33" is moved to a position of the third column in the main scanning direction and the third row in the sub-scanning direction by the process of step S22.

In the second image shown in FIG. 8A, a pixel "44" is a pixel which lies in a position of the column of the reference position in the row direction and the fourth row in the column direction. As shown in FIG. 8B, the pixel "44" is moved to a position of the fourth column in the main scanning direction and the fourth row in the sub-scanning direction by the process of step S22.

That is, the pixel which lies in a position of the column of the reference position in the row direction and the j-th row in the column direction is moved to a position of the j-th column in the main scanning direction and the j-th row in the sub-scanning direction by the process of step S22.

In the second image shown in FIG. 8A, a pixel "31" is a pixel which lies in a position of a column ((is−1)-th column) lying immediately before the column of the reference position in the row direction and the second row in the column direction. As shown in FIG. 8B, the pixel "31" is moved to a position of the first column in the main scanning direction and the third row in the sub-scanning direction by the process of step S22.

In the second image shown in FIG. 8A, a pixel "42" is a pixel which lies in a position of the column ((is −1)-th column) lying immediately before the column of the reference position in the row direction and the third row in the column direction. As shown in FIG. 8B, the pixel "42" is moved to a position of the second column in the main scanning direction and the fourth row in the sub-scanning direction by the process of step S22.

In the second image shown in FIG. 8A, a pixel "13" is a pixel which lies in a position of a column ((is+1)-th column) lying next to the column of the reference position in the row direction and the second row in the column direction. As shown in FIG. 8B, the pixel "13" is moved to a position of the third column in the main scanning direction and the first row in the sub-scanning direction by the process of step S22.

In the second image shown in FIG. 8A, a pixel "24" is a pixel which lies in a position of the column ((is+1)-th column) lying next to the column of the reference position in the row direction and the second row in the column direction. As shown in FIG. 8B, the pixel "24" is moved to a position of the fourth column in the main scanning direction and the second row in the sub-scanning direction by the process of step S22.

That is, in the second image shown in FIG. 8A, if the distance between the pixel lying in the j-th row and i-th column and the column of the reference position in the row direction is set to "a" (a=is−i), the pixel is moved (converted) to a position of the (j+a)-th column in the main scanning direction and the (j−a)-th row in the sub-scanning direction as shown in FIG. 8B. For example, in the second image, the pixel lying in a position of the first row and is-th column is moved to a position of the first column in the main scanning direction and the first row in the sub-scanning direction. Further, in the second image, the pixel lying in a position of the second row and (is−1)-th column is moved to a position of the third [(2+(is−(is−1)))-th] column in the main scanning direction and the first [(2−(is(is−1)))-th] row in the sub-scanning direction. The pixel lying in a position of the second row and (is+1)-th column in the second image is moved to a position of the first [(2+(is−(is+1)))-th] column in the main scanning direction and the third [(2−(is(is+1)))-th] row in the sub-scanning direction.

As described above, in the process of step S22, the pixels of the second image shown in FIG. 8A can be rearranged in a zigzag form while they are rotated by 45 degrees as shown in FIG. 8B without losing the pixels.

Further, it is required that the image to be actually superimposed be set in an area in which pixels of the second image are not lost by the process of step S22. As shown in FIG. 8B, in an image obtained after the process of step S22, "0" or a data value which is not transferred is set in a pixel (ineffective pixel) lying in a position which is not actually transferred. That is, it is required that pixels which configure an image to be actually superimposed be located in an area which is not lost by the process of step S22 in the second image. In other words, pixels of an image in a preset area (for example, areas surrounded by thick-line frames in FIG. 8A) in the second image are not lost and rearranged in a zigzag form while they are rotated by 45 degrees as pixels to be actually transferred by the engine section 5 of the alternate drive system. For example, in the example shown in FIG. 8A, the pixels in the areas surrounded by the thick-line frames are not lost by the process of step S22 and rearranged in the zigzag form as pixels to be actually printed by the engine section 5 of the alternate drive system.

The second image superimposed on the first image may be a multi-value image or a binary image such as a character or geometrical pattern. For example, when a binary image such as a character or geometrical pattern is used as the second image, the image can be superimposed by multiplying the pixel values of the pixels which configure the second image as the binary image subjected to the process of step S22 by the rearranged pixels of the first image.

It is assumed that the pixel value of a pixel of the binary image (second image) which is printed is set to "0" and the pixel value of a pixel which is not printed is set to "1". In this case, the pixel value of each pixel of the second image is multiplied by the pixel value of a corresponding pixel of the first image. As a result, the pixel value of a pixel on which a pixel to be printed in the second image is superimposed is set to "0" and the pixel value of a pixel on which a pixel not to be printed in the second image is superimposed is kept set at the pixel value of the first image. Thus, since the pixel having the pixel value of "0" in the second image is not printed, the binary image can be superimposed as "0" data. In other words, the pixel having the pixel value of "0" in the second image will have the pixel value of "0" in the superimposed image. Therefore, even if the first image is a multi-gradation image, the pixels of the second image can be superimposed on pixels whose pixel values are not "0" in the first image as the multi-gradation image and the pixels of the second image are not lost.

As described above, the process for arranging the pixels which configure the first image such as the multi-gradation image is performed, the process for reversely rotating the second image such as the binary image by 45 degrees and rearranging the pixels which configure the second image in the zigzag form is performed and then the process for superimposing the second image arranged in the zigzag form and rotated by 45 degrees on the first image arranged in the zigzag form is performed. As a result, the second image can be superimposed on the first image without losing the pixels of the second image.

Next, a recording material on which an image formed by the first image processing method is recorded is explained.

Figure 9:
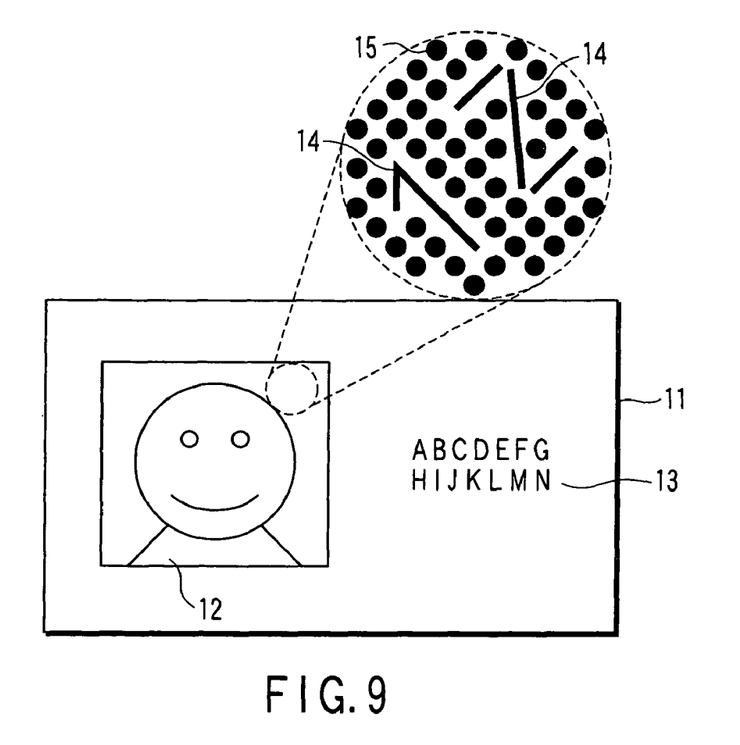
FIG. 9 is a diagram for schematically illustrating an example of a recording material on which an image formed by the first image processing method is printed.

FIG. 9 shows an example of a recording material formed by an image processing apparatus to which the first image processing method is applied. For example, on a recording material 11, a face image 12 as a first image on which the second image is superimposed and character information 13 are printed. That is, on the face image 12 as the first image, numerical information 14 as the second image which can be identified when it is enlarged is superimposed. Further, in the example of the printed matter shown in FIG. 9, "1" and "2" configured by 3 pixels×5 pixels are superimposed as the numerical information 14 used as the second image. That is, as shown in FIG. 9, the pixels of the numerical information 14 used as the second image are not lost and are superimposed on the face image 12 used as the first image in the image formed by the first or second image processing method and recorded on the printed matter. A reference symbol 15 in FIG. 9 indicates an enlarged dot.

If the recording material 11 formed by the image processing apparatus to which the first image processing method is applied is real, pixel information of the superimposed numerical information (second image) 14 is lost in a recording material 11 formed by another image processing apparatus to which the first image processing method is not applied. In other words, if the pixels of the second image to be superimposed in the image printed on the printed matter 11 are not lost, it can be determined that the recording material 11 is real. Further, if the pixels of the second image to be superimposed are lost, it can be determined that the recording material 11 is not real. Therefore, it becomes possible to easily and precisely determine whether the recording material 11 is real or not by checking whether the pixel information of the numerical information 14 is lost or not. Thus, the resistance to forgery of the recording material 11 can be enhanced.

As described above, with the first image processing method, pixel information of an embedded image (second image) such as a binary image is not lost and can be embedded in an embedding-use image (first image) such as a multi-gradation image even in an image recorded on the recording material by use of an image forming device of the alternate drive system. Further, as the result of the above process, an image which is excellent in the resistance to forgery or falsification can be formed and a printed matter which is excellent in the resistance to forgery or falsification and on which the above image is recorded can be provided.

Next, the second image processing method is explained in detail.

Figure 10:
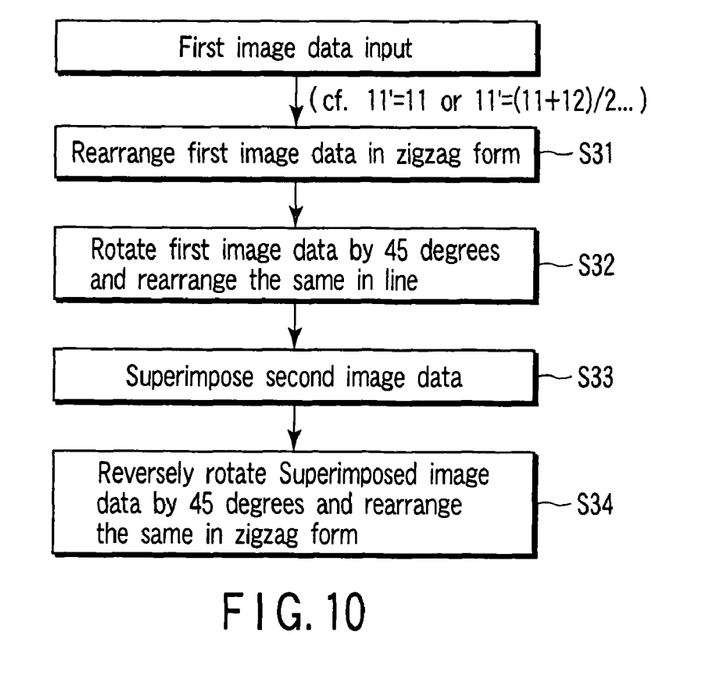
FIG. 10 is a flowchart for schematically illustrating the flow of a second image processing method.

FIG. 10 is a flowchart for schematically illustrating the flow of the second image processing method.

Figure 11A:
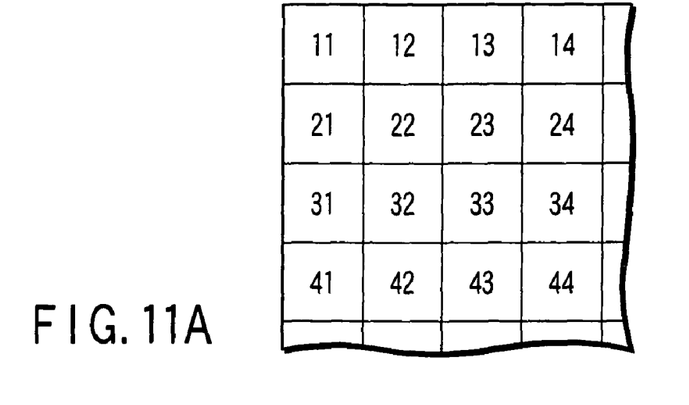
FIG. 11A is a diagram for illustrating the array of pixels of first image data to which a process (first process) by the second image processing method is applied.

First, the scanner section 1 acquires original image data of first image data of single color in which each pixel is divided into Y, M, C or Y, M, C, K. In the input correcting section 2 and color correcting section 3, the original image data acquired by the scanner section 1 is subjected to a preset data process. Image data processed by the input correcting section 2 and color correcting section 3 is supplied to the image superimposing section 4 as first image data. FIG. 11A is a diagram showing an example of the array of pixels of the first image data supplied to the image superimposing section 4.

Figure 11B:
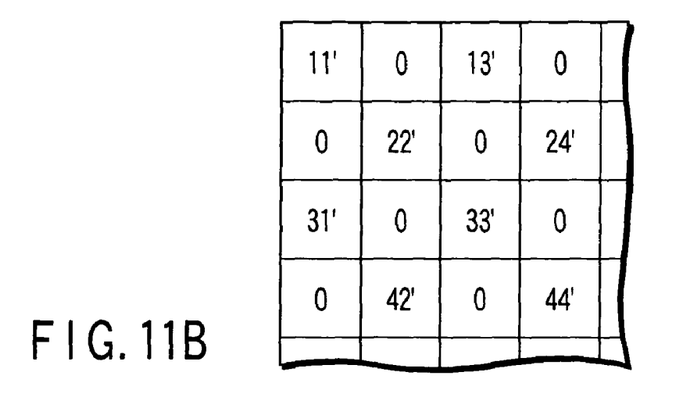
FIG. 11B is a diagram for illustrating the array of pixels of first image data obtained by subjecting the first image data of FIG. 11A to a process for rearranging the pixels in a zigzag form.

When supplied with the first image data, the image superimposing section 4 performs a process for rearranging the pixels of the first image data into a zigzag array (step S31). FIG. 11B is a diagram showing the array of pixels in the first image data obtained by subjecting the first image data of FIG. 11A to a process for rearranging the pixels in a zigzag form (the process of step S31). FIGS. 11A and 11B are substantially the same as FIGS. 7A and 7B. That is, the process of the step S31 is the same process as step S21 in the first image processing method.

Figure 11C:
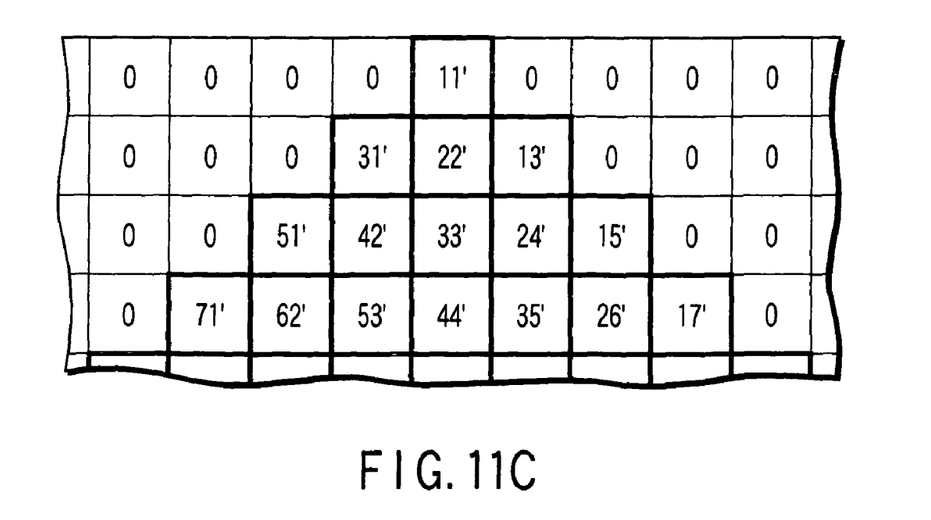
FIG. 11C is a diagram for illustrating the array of pixels of first image data obtained by subjecting the first image data of FIG. 11B to a rotating process.

Next, the image superimposing section 4 performs a process for rearranging the pixels to rotate the pixels by 45 degrees in the clockwise direction with the preset position of the image (for example, the center of the image) set as an axis with respect to image data in which the pixels are arranged in a zigzag array form (step S32). FIG. 11C is a diagram showing the array of the pixels of the first image data obtained by subjecting the first image data of FIG. 11B to step S32 (rotating process). As shown in FIG. 1C, in the process of step S32, the pixels arranged in the zigzag form are rearranged in the row direction and column direction with the pixels rotated by 45 degrees in the clockwise direction.

For example, as shown in FIG. 1C, the pixel "11" is moved to the center position of the first row in the image obtained after conversion. The pixels "31", "22", "13" are arranged on the second row in the column direction. The pixel "22" is arranged in the center position (in the same position as the pixel "11") in the row direction on the second row in the column direction. The pixel "31" is arranged on the left side of the central position (on the left side of the pixel "22") on the second row in the column direction and the pixel "13" is arranged on the right side of the central position (on the right side of the pixel "22") on the second row in the column direction. That is, each pixel is moved to [(the line number in the column direction+the line number in the row direction)]-th row in the column direction. If the pixels are rearranged, image data of the pixel array as shown in FIG. 11B is converted into image data of the pixel array as shown in FIG. 11C.

Next, the image superimposing section 4 performs a process for superimposing second image data on first image data subjected to step S32 (step S33). In the process, the second image is superimposed on an area in which effective pixels are arranged by the process of step S32. For example, in the first image data shown in FIG. 11C, areas surrounded by thick lines are areas in which effective pixels are arranged. Like the case of the first image processing method, the second image data may be a multi-value image or a binary image such as a character or geometrical pattern.

Figure 12A:
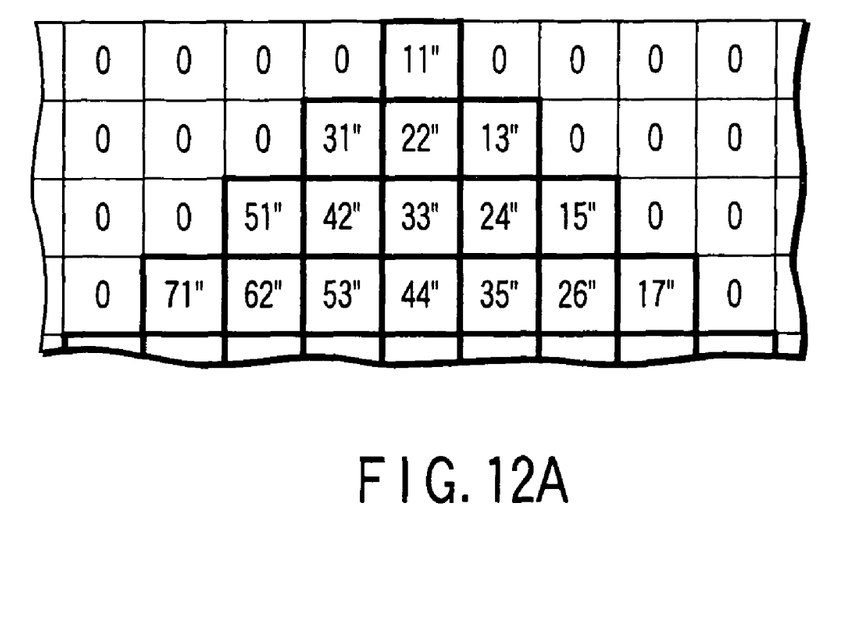
FIG. 12A is a diagram for illustrating the array of pixels of image data obtained by superimposing the second image data on the first image data in the second processing method.

FIG. 12A is a diagram showing the array of pixels of a superimposed image obtained by superimposing the second image data on the first image data shown in FIG. 11C.

When a binary image such as a character or geometrical pattern is superimposed, the image superimposing section 4 superimposes the second image data on the first image data by multiplying the value of each pixel of the second image data as the binary image by the corresponding pixel of the first image data processed in step S32. For example, it is supposed that the value of the pixel to be printed in the binary image used as the second image is set to "0" and the value of the pixel not to be printed is set to "1". If the pixel values are multiplied by the pixels of the first image data in corresponding positions, the pixel value of the pixel to be printed in the binary image is set to "0" and the value of the pixel not to be printed is kept set at the original value. Therefore, since the pixel having the value of "0" is not printed, the binary image can be superimposed as "0" data.

If the second image data is superimposed on the first image data subjected to the process of step S32, the image superimposing section 4 performs a process for rearranging the pixels in a zigzag array form while rotating the image subjected to the superimposing process in step S33 by 45 degrees in a direction (counterclockwise direction) opposite to that in the process of step S32 (step S34).

Figure 12B:
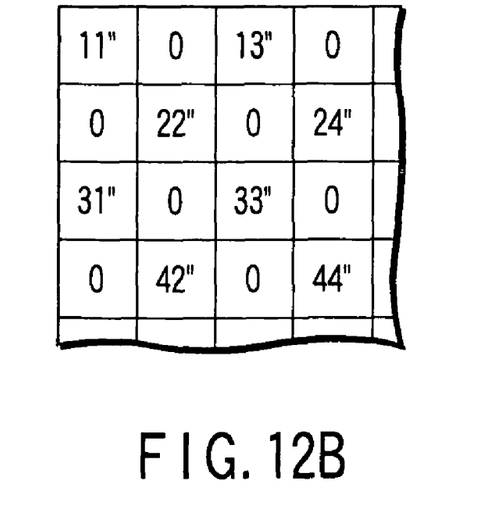
FIG. 12B is a diagram for illustrating the array of pixels of image data obtained by subjecting the image data of FIG. 12A to a reverse rotating process.

FIG. 12B is a diagram showing the array of pixels of image data obtained by subjecting the image data shown in FIG. 12A to the process of step S34 (reverse rotating process). As shown in FIG. 12B, the pixels on which the second data is superimposed by the process of step S33 are not lost in the process of step S34 and are used as pixels corresponding to dots actually transferred in the engine section 5 of the alternate drive system.

That is, in the image data obtained as the processing result by step S34, pixels corresponding to dots actually transferred in the engine section 5 of the alternate drive system become effective. Further, in the image data obtained as the processing result by step S34, pixels of the second image data are respectively superimposed on the pixels corresponding to dots actually transferred in the engine section 5 of the alternate drive system.

As described above, in the second image processing method, a simple process for rotating the first image by 45 degrees and linearly rearranging the pixels on a row after arranging the pixels of the first image of multi-gradation in a zigzag form is performed. In the above simple process, the second image is superimposed on the first image and then the pixels in the superimposed image are returned to the zigzag array by reversely rotating the pixels by 45 degrees. Thus, in the second image processing method, different image information can be superimposed on the multi-gradation image without losing pixel information of the different image.

Further, when an image formed by the second image processing method is recorded on a recording medium, a printed matter as shown in FIG. 9 can be obtained. That is, like the printed matter on which an image formed by the first image processing method is recorded, a printed matter which is excellent in the resistance to forgery and can be easily determined to be true or false can be provided by recording an image formed by the second image processing method on a recording medium.

The present embodiment is not limited to the above contents and can be embodied by variously modifying the constitutions without departing from the technical scope thereof at the embodying stage. Further, various inventions can be made by adequately combining a plurality of constituents disclosed in the above embodiment. For example, some constituents can be eliminated from the whole constituents disclosed in the above embodiment. Further, the constituents disclosed in the different embodiments can be adequately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method which forms an image on a recording medium by alternately driving a plurality of heaters linearly arranged in a main scanning direction, comprising:

replacing even-numbered pixels of first image data in the main scanning direction on alternate recording lines in a sub-scanning direction and odd-numbered pixels of the first image data in the main scanning direction on different alternate recording lines in the sub-scanning direction by pixels of data which is not recorded, rotating second image data which is different from the first image data by a present angle and converting pixels of the second image data of respective recording lines into pixels of image data which are arranged in odd-numbered and even-numbered locations in the main scanning direction for respective alternate lines in the sub-scanning direction, and superimposing the second image data processed on the first image data processed.

2. The image processing method according to claim 1, wherein the first image data is a multi-gradation image.

3. The image processing method according to claim 1, wherein the second image data is a binary image.

4. The image processing method according to claim 1, wherein the preset angle is 45 degrees.

5. An image processing apparatus which forms an image on a recording medium by alternately driving a plurality of heaters linearly arranged in a main scanning direction, comprising:

a first processing section which replaces even-numbered pixels and odd-numbered pixels of first image data in the main scanning direction by pixels of data which is not recorded alternately for respective lines in a sub-scanning direction, a second processing section which rotates second image data which is different from the first image data by a preset angle and converts pixels of the second image data into pixels of image data which are arranged in odd-numbered and even-numbered locations in the main scanning direction alternately for respective lines in the sub-scanning direction, and a third processing section which superimposes the second image data processed by the second processing section on the first image data processed by the first processing section.

6. The image processing apparatus according to claim 5, wherein the first image data is a multi-gradation image.

7. The image processing apparatus according to claim 5, wherein the second image data is a binary image.

8. The image processing apparatus according to claim 5, wherein the preset angle is 45 degrees.

* * * * *